US011320971B2

(12) United States Patent
Park et al.

(10) Patent No.: US 11,320,971 B2
(45) Date of Patent: *May 3, 2022

(54) TERMINAL DEVICE, SERVER AND METHOD FOR DISPLAYING WEBPAGE HAVING DYNAMIC OBJECT

(71) Applicant: NAVER CORPORATION, Seongnam-si (KR)

(72) Inventors: Cheol Oh Park, Seongnam-si (KR); Yu Jun Lee, Seongnam-si (KR); Se Il Hwang, Seongnam-Si (KR); Dong Ho Jeon, Seongnam-si (KR); Bo Hyun Kim, Seongnam-si (KR); Ju An Hwang, Seongnam-si (KR); Sung Mi Kim, Seongnam-si (KR); Seon Young Jung, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,694

(22) Filed: Jun. 8, 2020

(65) Prior Publication Data

US 2020/0301570 A1    Sep. 24, 2020

Related U.S. Application Data

(63) Continuation of application No. 15/427,736, filed on Feb. 8, 2017, now Pat. No. 10,788,962, which is a
(Continued)

(30) Foreign Application Priority Data

Aug. 8, 2014    (KR) ......................... 10-2014-0102331

(51) Int. Cl.
*G06F 3/04842*    (2022.01)
*G06F 3/0485*    (2022.01)
(Continued)

(52) U.S. Cl.
CPC ........ *G06F 3/04842* (2013.01); *G06F 3/0485* (2013.01); *G06F 16/954* (2019.01); *G06Q 30/0277* (2013.01)

(58) Field of Classification Search
CPC .. G06F 3/04842; G06F 16/954; G06F 3/0485; G06Q 30/0277
See application file for complete search history.

(56) References Cited

U.S. PATENT DOCUMENTS 6,379,251 B1    4/2002  Auxier et al.
8,261,205 B2 *  9/2012  Lee ..................... G06F 3/04817
                                                  715/830
(Continued)

FOREIGN PATENT DOCUMENTS

JP    2001229271 A    8/2001
JP    2002175464 A    6/2002
(Continued)

OTHER PUBLICATIONS

Office action issued in Korean patent application No. KR 10-2016-0126861, dated Feb. 22, 2018.
(Continued)

*Primary Examiner* — Beau S Spratt
(74) *Attorney, Agent, or Firm* — Greer Burns & Crain Ltd.

(57) ABSTRACT

A webpage display method performed by a terminal device includes displaying a webpage on a screen, receiving a selection by a user with respect to an image included in the webpage displayed on the screen, and displaying, on the screen, a dynamic object responsive to the user selection of the image. The method further includes performing a predetermined function corresponding to the image while displaying the dynamic object on the screen. The dynamic object floats on the screen independently from the movement of the webpage on the screen, and is not displayed on
(Continued)

the screen while the webpage is displayed on the screen, until the selection of the image. The dynamic object is removed from the screen while the webpage is still displayed on the screen when the predetermined function corresponding to the image is completed.

8 Claims, 11 Drawing Sheets

Related U.S. Application Data continuation of application No. PCT/KR2015/006413, filed on Jun. 24, 2015.

(51) Int. Cl.
*G06F 16/954* (2019.01)
*G06Q 30/02* (2012.01)

(56) References Cited

U.S. PATENT DOCUMENTS

| | | | |
|---|---|---|---|
| 9,183,258 B1* | 11/2015 | Taylor | G06F 16/9577 |
| 9,383,888 B2 | 7/2016 | Fish | |
| 9,607,321 B2 | 3/2017 | Brown et al. | |
| 2001/0056370 A1 | 12/2001 | Tafla | |
| 2003/0177265 A1 | 9/2003 | Page et al. | |
| 2005/0210414 A1* | 9/2005 | Angiulo | G06F 16/958 |
| | | | 707/E17.116 |
| 2010/0036740 A1 | 2/2010 | Barashi | |
| 2011/0035263 A1 | 2/2011 | Ramanathan | |
| 2011/0093811 A1 | 4/2011 | Park et al. | |
| 2011/0252350 A1* | 10/2011 | Chaudhri | G06F 9/451 |
| | | | 715/769 |
| 2013/0235044 A1 | 9/2013 | Kaleta | |
| 2013/0305170 A1* | 11/2013 | de Souza | G06Q 30/02 |
| | | | 715/760 |
| 2014/0089097 A1 | 3/2014 | Byun et al. | |
| 2014/0095328 A1* | 4/2014 | Forouzandeh | G06Q 30/0277 |
| | | | 705/14.73 |
| 2014/0215386 A1* | 7/2014 | Song | G06F 3/0488 |
| | | | 715/787 |
| 2014/0304658 A1* | 10/2014 | Larkina | G06F 3/04817 |
| | | | 715/838 |
| 2014/0325398 A1* | 10/2014 | van de Bruggen | G06F 9/453 |
| | | | 715/760 |
| 2015/0029197 A1* | 1/2015 | Almosnino | G06T 13/80 |
| | | | 345/474 |
| 2015/0169567 A1* | 6/2015 | Singh | G06F 16/51 |
| | | | 707/722 |
| 2015/0177933 A1 | 6/2015 | Cueto | |

FOREIGN PATENT DOCUMENTS

| | | |
|---|---|---|
| JP | 2008021303 A | 1/2008 |
| JP | 2008269198 A | 11/2008 |
| JP | 200964070 | 3/2009 |
| JP | 2011044013 A | 3/2011 |
| KR | 20000059167 A | 10/2000 |
| KR | 100709584 | 4/2007 |
| KR | 1020130016408 | 2/2013 |
| KR | 1020130141651 A | 12/2013 |
| KR | 1020140040318 A | 4/2014 |
| WO | 2001312656 A | 11/2001 |
| WO | 2008140000 A1 | 11/2008 |
| WO | 2012088021 A1 | 6/2012 |

OTHER PUBLICATIONS

Japanese office action issued Japanese application No. 2017-527521, dated Oct. 30, 2018.
Japanese office action issued Japanese application No. 2017-527521, dated Feb. 5, 2019.
Japanese office action issued Japanese application No. 2017-527521, dated Mar. 13, 2018.
International Search report issued in International Application No. PCT/KR2015/006413, dated Oct. 7, 2015.
Korean office actions issued in corresponding Korean Patent Appln. No. 10-2014-0102331, dated Feb. 23, 2016.
The Royal British Legion, Follow the Poppy Webpage (online). The Royal British Legion, 2012 (retrieved on Nov. 22, 2018); retrieved from the internet: URL: http://poppyspend.britishlegion.org.uk.

* cited by examiner

TERMINAL DEVICE, SERVER AND METHOD FOR DISPLAYING WEBPAGE HAVING DYNAMIC OBJECT

CROSS-REFERENCE TO RELATED APPLICATIONS

This application is a continuation of U.S. patent application Ser. No. 15/427,736 filed Feb. 8, 2017, which is a continuation of International Application No. PCT/KR2015/006413, filed Jun. 24, 2015, which claims the benefit of Korean Patent Application No. 10-2014-0102331, filed on Aug. 8, 2014.

BACKGROUND OF THE INVENTION

Field of the Invention

The present disclosure relates to a terminal device and a webpage display method performed by the terminal device, and a web server and a webpage providing method performed by the web server.

Related Art

Companies operating a web server provide various services to a user through a webpage transmitted to a user terminal. For example, portal site companies provide various types of information, such as weather, dictionaries, performances, trips, and movies, and the user may easily and conveniently obtain desired information by searching for certain information through a webpage anytime.

Also, companies operating web servers induce the user to purchase certain services or products by including an advertisement on the webpage, but since advertisements currently provided by most companies is in a form of a simple image or video, it is difficult to draw attention of the user and thus an advertising effect is not fully shown. Accordingly, an effective method for drawing the attention of the user is required.

SUMMARY OF THE INVENTION

Provided are a terminal device and a webpage display method performed by the terminal device, and a web server and a webpage providing method performed by the web server, whereby an effect of an advertisement included in a webpage is increased.

Also, provided are a terminal device and a webpage display method performed by the terminal device, and a web server and a webpage providing method performed by the web server, whereby advertising information is provided to a user by using a user interface (UI) for attracting attention of the user.

Also, provided are a terminal device and a webpage display method performed by the terminal device, and a web server and a webpage providing method performed by the web server, whereby advertising profitability of web server companies is increased.

A terminal device and a webpage display method performed by the terminal device, and a web server and a webpage providing method performed by the web server, according to embodiments of the present disclosure may increase an effect of an advertisement included in a webpage.

Also, a terminal device and a webpage display method performed by the terminal device, and a web server and a webpage providing method performed by the web server, according to embodiments of the present disclosure may provide advertising information to a user by using a user interface (UI) for attracting attention of the user.

Also, a terminal device and a webpage display method performed by the terminal device, and a web server and a webpage providing method performed by the web server, according to embodiments of the present disclosure may increase advertising profitability of web server companies.

According to an aspect of an embodiment, a webpage display method performed by a terminal device includes: displaying a first webpage on a screen; receiving selection of a user with respect to a first image included in the first webpage displayed on the screen; and performing a predetermined function corresponding to the first image.

According to an aspect of another embodiment, a terminal device includes: a display unit; a controller configured to display a first webpage on a screen of the display unit by using a predetermined application; and a user input receiver configured to receive selection of a user with respect to a first image included in the first webpage displayed on the screen, wherein the controller performs a predetermined function corresponding to the first image.

According to an aspect of another embodiment, a webpage providing method performed by a web server includes: receiving a request for a first webpage from a terminal device; and providing the first webpage to the terminal device according to the request of the terminal device, wherein the first webpage controls the terminal device to perform a predetermined function corresponding to a first image included in the first webpage when selection of a user with respect to the first image is received while the first webpage is displayed on a screen of the terminal device.

According to an aspect of another embodiment, a web server includes: a storage unit configured to store a first webpage; and a communication unit configured to provide the stored first webpage to a terminal device according to a request of the terminal device, wherein the first webpage controls the terminal device to perform a predetermined function corresponding to a first image included in the first webpage when selection of a user with respect to the first content image is received while the first webpage is displayed on a screen of the terminal device.

DETAILED DESCRIPTION OF THE INVENTION

Figure 1:
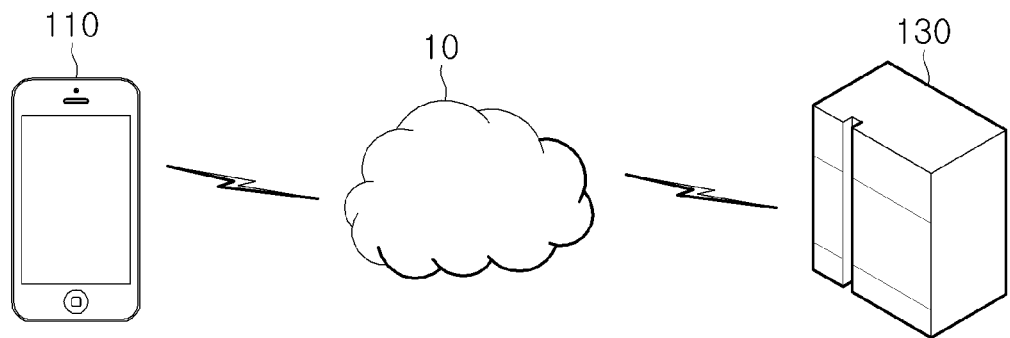
FIG. 1 is a diagram of a terminal device and a web server, according to an embodiment of the present disclosure.

While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims. Throughout the specifications, the same reference numerals will refer to the same elements.

According to exemplary embodiments of the present disclosure, the word "unit" may refer to a software component or hardware component such as an FPGA or ASIC capable of carrying out a function or an operation. However, "unit" is not limited to hardware or software. A unit may be configured so as to reside in an addressable storage medium or to drive one or more processors. Units may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units, or further divided into units along with other components.

FIG. 1 is a diagram of a terminal device 110 and a web server 130 according to an embodiment of the present disclosure.

As shown in FIG. 1, the terminal device 110 and the web server 130 are connected to each other through a network 10. The network 10 may include a wired network and a wireless network, and in detail, may include various networks, such as local area network (LAN), a metropolitan area network (MAN), and a wide area network (WAN). Also, the network 10 may include a world wide web (WWW). However, the network 10 according to the present disclosure is not limited thereto, and may include, at least in part, a well-known wireless data network, a well-known phone network, and a well-known wired or wireless television network.

The terminal device 110 requests the web server 130 for a webpage, and executes the webpage received from the web server 130 through a predetermined application, such as a web browser. The terminal device 110 may receive the webpage from the web server 130 based on an address of the web server 130 input by a user.

In FIG. 1, a smart phone is illustrated as the terminal device 110, but the terminal device 110 according to an embodiment of the present disclosure may include not only a smart phone, but also various terminal devices, such as a desktop computer, a laptop computer, a personal digital assistant (PDA), a web pad, and a tablet personal computer (PC), which are capable of executing a webpage by using a predetermined application.

The web server 130 transmits the webpage to the terminal device 110 when a request of the terminal device 110 for the webpage is received.

The terminal device 110 according to an embodiment of the present disclosure may perform a predetermined function according to the selection of the user with respect to an image included in the webpage, as will be described with reference to FIG. 2.

Figure 2:
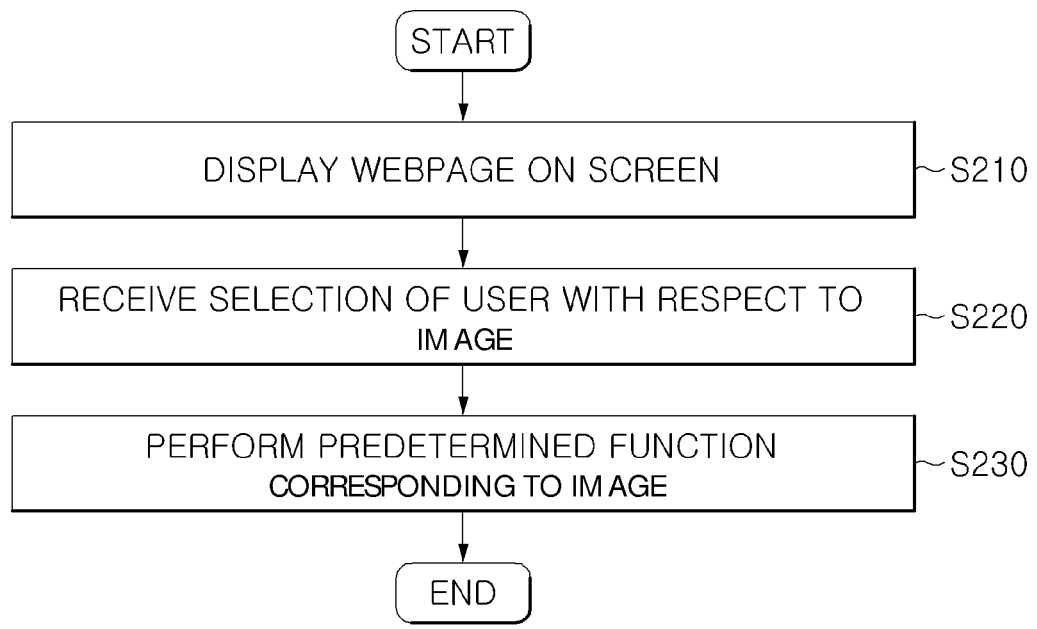
FIG. 2 is a flowchart of a webpage display method according to an embodiment of the present disclosure.

FIG. 2 is a flowchart of a webpage display method according to an embodiment of the present disclosure. FIG. 2 is a diagram for describing operations performed by the terminal device 110.

In operation S210, the terminal device 110 displays a webpage on a screen by using a predetermined application. The terminal device 110 may receive the webpage from the web server 130, and display the webpage on the screen of the terminal device 110 through the predetermined application. The predetermined application includes an application capable of performing a function of a web browser.

In operation S220, the terminal device 110 receives selection by a user with respect to an image included in the webpage. The image may include an advertisement for a certain company, a purchase inducing advertisement for a product or service, etc. The user may select the image through a touch input, a click input using a mouse, or the like with respect to the image. Also, the user may select the image by touching or clicking the image, dragging the image in a certain direction, and then stopping touching or clicking the image.

In operation S230, the terminal device 110 performs a predetermined function corresponding to the image. The predetermined function may include a function of the predetermined application, and for example, may include a function of displaying a top or bottom of a webpage being currently displayed on a screen, a function of changing a webpage to another webpage, or a function of registering a webpage as a favorite. The terminal device 110 may perform the predetermined function corresponding to the image while displaying a dynamic object corresponding to the image on the screen, as will be described below with reference to FIGS. 5A through 5C and 6A through 6C.

The terminal device 110 according to an embodiment of the present disclosure displays the image for performing the predetermined function on the screen, and thus the user has to select the image in order to perform the predetermined function. Accordingly, when the image is an advertisement, attention of the user may be focused on the advertisement, and thus an advertising effect may increase.

Also, in a point of view of a company operating the web server 130, by including the image capable of simultaneously performing an advertising function and the predetermined function to the webpage, the company may sell a region on the webpage for performing the predetermined function to an advertising company, thereby increasing profitability.

Figure 3:
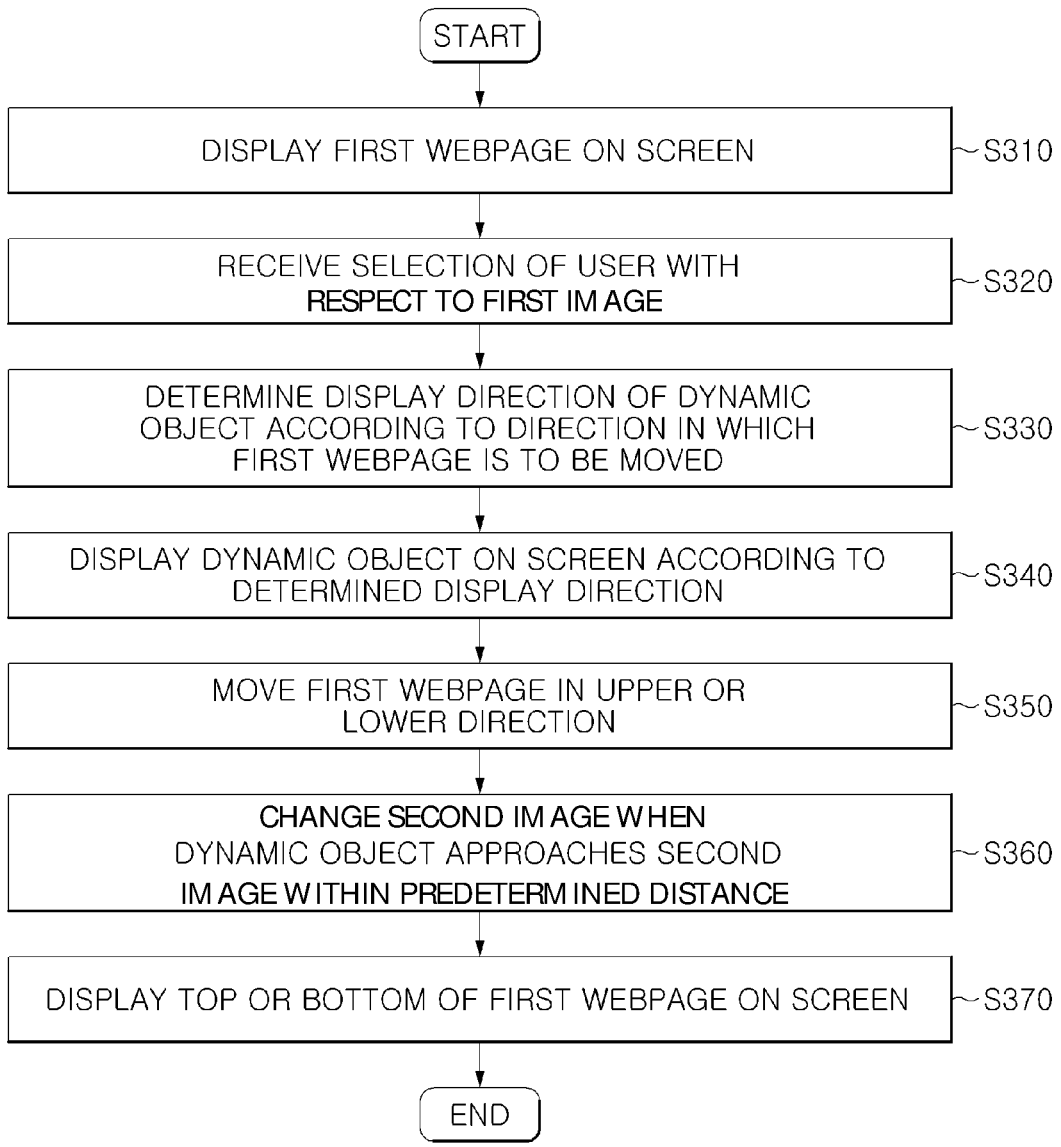
FIG. 3 is a detailed flowchart of a webpage display method according to an embodiment of the present disclosure.

FIG. 3 is a detailed flowchart of a webpage display method according to an embodiment of the present disclosure, and describes operations of the terminal device 110 when a predetermined function is a function of displaying the top or bottom of a webpage. Some of the operations of FIG. 3 may be omitted or a certain operation may be added to the operations of FIG. 3 as long as technical ideas are within the scope of the present disclosure.

In operation S310, the terminal device 110 displays a first webpage on the screen of the terminal device 110. As described above, the terminal device 110 may display the first webpage on the screen by executing a predetermined application.

In operation S320, the terminal device 110 receives selection of a user with respect to a first image included in the first webpage. The selection of the user may include various types of selection inputs, such as a touch input, a click input using a mouse, etc. with respect to the first image. Also, the user may select the first image by touching or clicking the first image, dragging the first image in a certain direction, and then stopping touching or clicking the first image.

The first image may be located at the top or the bottom of the first webpage, and when the first image is located at the bottom of the first webpage, a function corresponding to the first image may be a function of displaying the top of the first webpage on the screen. On the other hand, when the first image is located at the top of the first webpage, the function corresponding to the first image may be a function of displaying the bottom of the first webpage on the screen. However, the location of the first image in the first webpage is not limited to the top or the bottom of the first webpage, and the first image may be located anywhere in the first webpage. Here, when the first image is selected, another point of the first webpage may be displayed on the screen.

In operation S330, the terminal device 110 determines a display direction of a dynamic object according to a direction in which the first webpage is to be moved. When the first image is selected to display the top or bottom of the first webpage while the first webpage is displayed on the screen, the first webpage needs to be moved in an upper or lower direction. Here, movement in an upper direction means that a screen displaying a certain location of a webpage is scrolled downward such that a region of the webpage below the certain location is displayed, and movement in a lower direction means that a screen displaying a certain location of a webpage is scrolled upward such that a region of the webpage above the certain location is displayed.

For example, when the function corresponding to the first image is the function of displaying the top of the first webpage, the first webpage is moved in the lower direction, and when the function corresponding to the first image is the function of displaying the bottom of the first webpage, the first webpage is moved in the upper direction. The terminal device 110 may determine the display direction of the dynamic object according to the direction in which the first webpage is to be moved.

Meanwhile, the top of the first webpage may include a region displayed on the screen when the first webpage displayed on the screen is no longer moved in the lower direction, and the bottom of the first webpage may include a region displayed on the screen when the first webpage displayed on the screen is no longer moved in the upper direction.

In operation S340, the terminal device 110 displays the dynamic object on the screen according to the display direction determined in operation S330. The dynamic object may include a floating object displayed in a floating manner. The floating object denotes an object displayed on the screen independently from the movement of the first webpage. In other words, even when the terminal device 110 moves the first webpage, the floating object displayed on the screen may be located at a pre-set point irrelevantly to the movement of the first webpage, or may move at a speed different from the movement of the first webpage.

In operation S350, the terminal device 110 moves the first webpage in the lower or upper direction so as to display the top or bottom of the first webpage. The floating object displayed on the screen may be located at a certain point or move in a certain direction when the first webpage moves.

In operation S360, the terminal device 110 may change the appearance of a second image included in the first webpage when the dynamic object displayed on the screen approaches the second image or a certain image element from among image elements included in the second image within a predetermined distance.

Since the appearance of the second image is changed when the dynamic object displayed on the screen according to the selection with respect to the first image approaches the second image, the user may focus the attention, for example, on an advertisement, through a series of operations of the first image, the dynamic object, and the second image.

When the first image is at the bottom of the first webpage, the second image may be located at the top of the first webpage, and when the first image is at the top of the first webpage, the second image may be located at the bottom of the first webpage.

A function opposite to the function corresponding to the first image may be set as a function corresponding to the second image. For example, when the function corresponding to the first image is the function of displaying the bottom of the first webpage on the screen, the function corresponding to the second image may be a function of displaying the top of the first webpage on the screen.

In operation S370, the terminal device 110 displays the top or bottom of the first webpage on the screen.

Hereinafter, detailed operations of the terminal device 110 when a function corresponding to a first image 420 is a function of displaying the top of a first webpage 410 will be described with reference to FIGS. 4 and 5A through 5C. The same description may be equally applied when the function corresponding to the first image 420 is a function of displaying a bottom of the first webpage 410.

Figure 4:
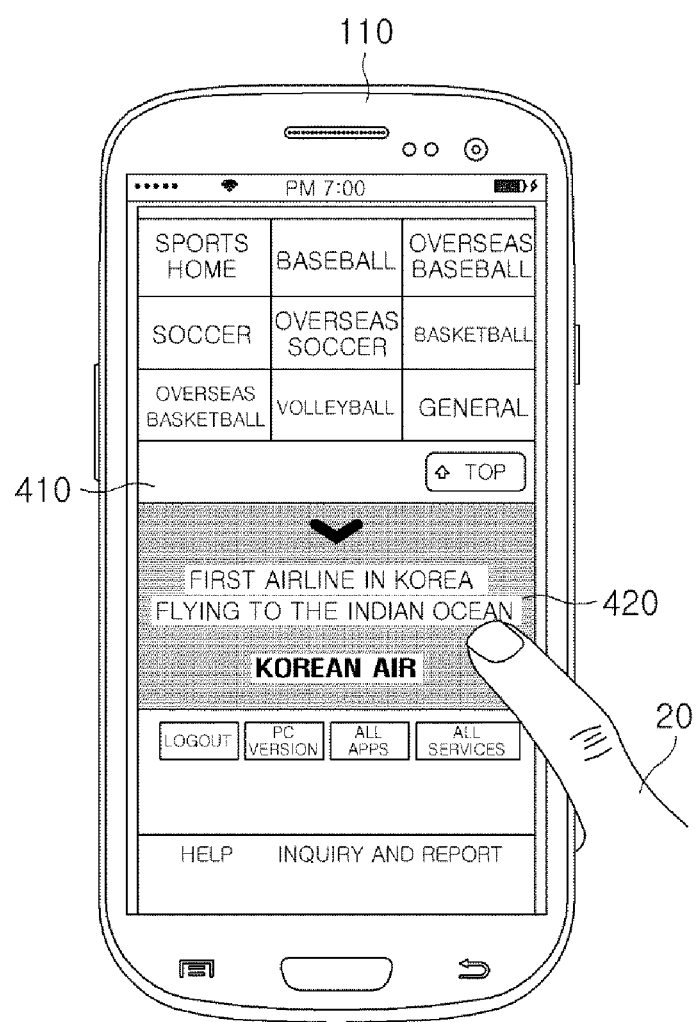
FIG. 4 illustrates a first image included in a first webpage.
Figure 5A:
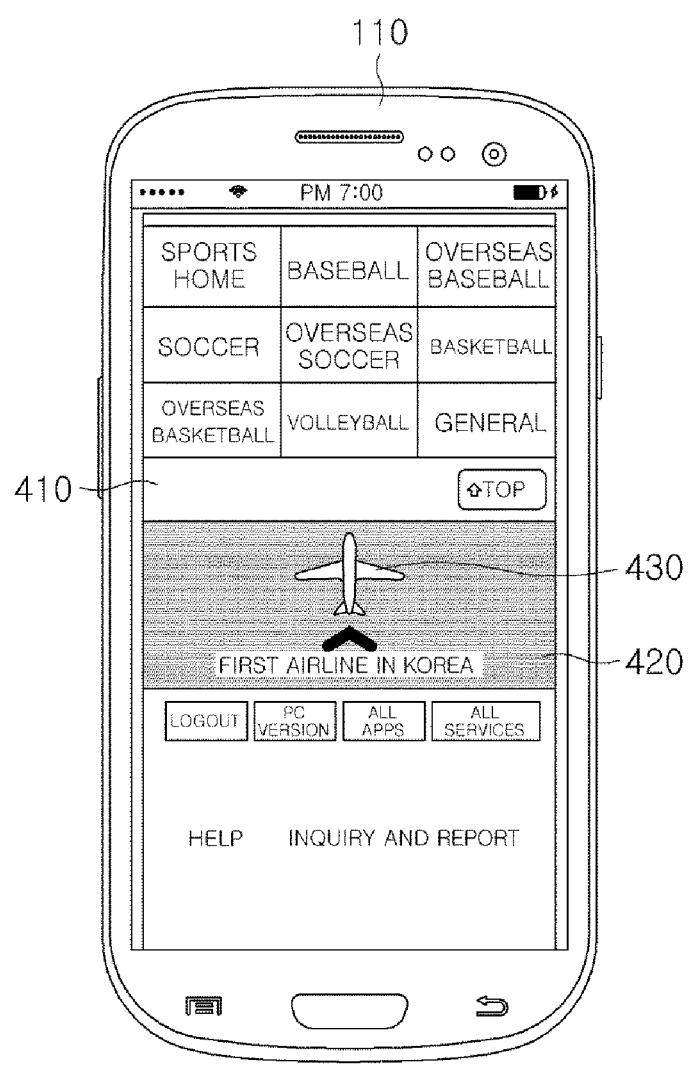
FIGS. 5A through 5C are diagrams for describing an operation of a terminal device when the first image is selected by a user.
Figure 5B:
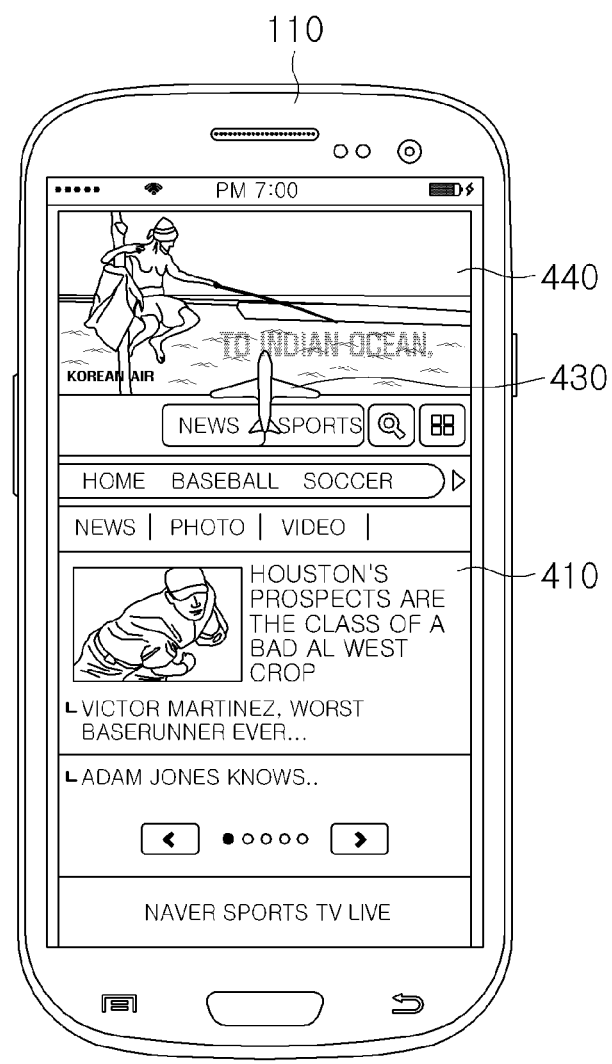
Figure 5C:
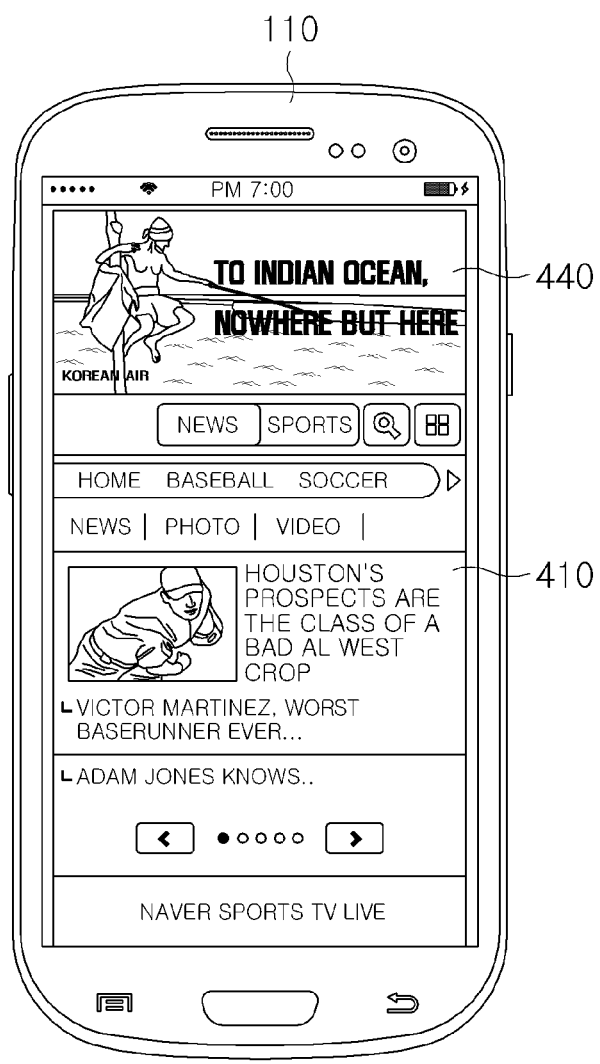

FIG. 4 illustrates the first image 420 included in the first webpage 410, and FIGS. 5A through 5C are diagrams for describing an operation of the terminal device 110 when the first image 420 is selected by a user 20.

As shown in FIG. 4, the first webpage 410 includes the first image 420 at the lower region of the first webpage 410. The first image 420 may be located not only at the bottom of the first webpage 410, but also at any point of the first webpage 410. The user 20 may select the first image 420 so as to display the top of the first webpage 410 on the screen. The user 20 select the first image 420 in various manners, for example, may select the first image 420 through a short-touch input of touching the first image 420 within a predetermined time period, a long-touch input of touching the first image 420 for at least the predetermined time period, a click input using a mouse, and an input of touching and then dragging the first image 420 in a predetermined direction. The first image 420 may display a description for selecting the first image 420.

When the selection of the user 20 with respect to the first image 420 is completed, the terminal device 110 determines a display direction of a dynamic object 430 based on a direction in which the first webpage 410 is to be moved. When the function corresponding to the first image 420 is the function of displaying the top of the first webpage 410, the first webpage 410 shown in FIG. 4 needs to be moved in a lower direction, and thus the terminal device 110 may display the dynamic object 430, e.g., an airplane object, facing in the upper direction on the screen as shown in FIG. 5A. When the function corresponding to the first image 420 is the function of displaying the bottom of the first webpage 410, the terminal device 110 may determine the display direction of the dynamic object 430 shown in FIG. 5A to be in the lower direction.

The terminal device 110 may move the dynamic object 430 in the upper direction while the first webpage 410 is moved in the lower direction. As shown in FIG. 5B, when a second image 440 is located at the top of the first webpage 410, the terminal device 110 may move the dynamic object 430 in a direction from the first image 420 towards the second image 440. Accordingly, the user may determine that the first image 420, the second image 440, and the dynamic object 430 are related to each other.

When the dynamic object 430 approaches the second image 440 within a predetermined distance, or approaches a certain image element from among image elements included in the second image 440 within the predetermined distance, the terminal device 110 may remove the dynamic object 430 from the screen. Here, as shown in FIG. 5C, the appearance of the second image 440 may be changed.

The terminal device 110 may change the second image 440 by including the certain image element to the second image 440, removing some of the image elements included in the second image 440, or changing all or some of the image elements included in the second image 440 to other image elements.

A function corresponding to the second image may be a function opposite to the function corresponding to the first image. For example, when the function corresponding to the first image is a function of displaying the bottom of the first webpage on the screen, the function corresponding to the second image may be a function of displaying the top of the first webpage on the screen. A processing method in which the second image is selected is the same as the method described above with reference to the first image.

When the first image 420 located at the bottom of the first webpage 410 is selected by the user 20, the attention of the user 20 on the content of the first and second images may be increased through the dynamic object 430 moving from the first image 420 to the second image 440, and the second image 440 changing as the dynamic object 430 approaches.

Hereinafter, detailed operations of the terminal device 110 when the function corresponding to the first image is a function of changing the first webpage to a second webpage will be described.

Figure 6A:
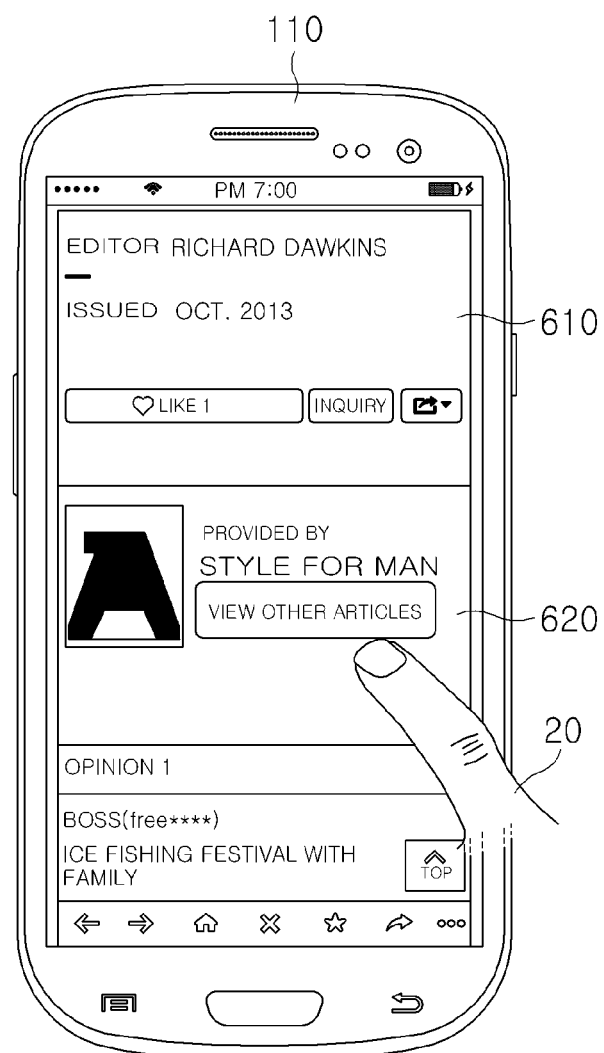
FIGS. 6A through 6C are diagrams for describing another operation of the terminal device when the first image is selected by the user.
Figure 6B:
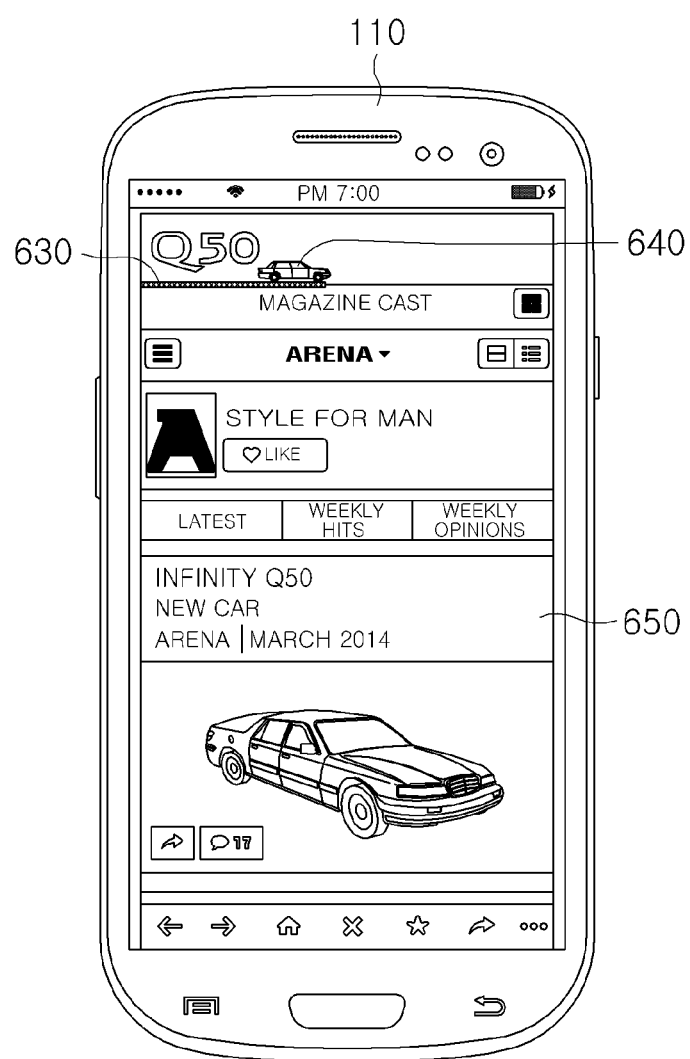
Figure 6C:
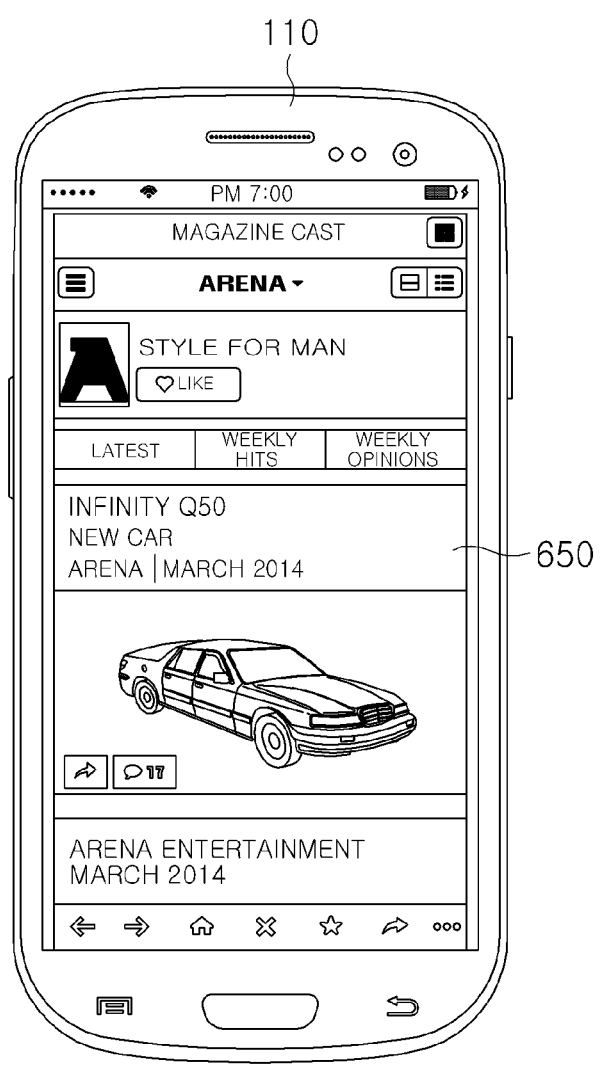

FIGS. 6A through 6C are diagrams for describing another operation of the terminal device 110 when a first image 620 is selected by the user 20.

As shown in FIG. 6A, the first image 620 may be included in a first webpage 610, and a location of the first image 620 may be variously determined. As described above, the user may select the first image 620 via any one of various manners.

When the user 20 selects the first image 620, the terminal device 110 changes the first webpage 610 to a second webpage 650 as shown in FIG. 6B, while displaying a dynamic object 640 moving together with a progress bar 630 indicating a loading degree of the second webpage 650.

When loading of the second webpage 650 is completed, the terminal device 110 removes the dynamic object 640 from the screen, and displays the second webpage 650 on the screen.

Operations and shapes of the dynamic objects 430 and 640 shown in FIGS. 5A through 6C are only examples, and any operation or shape of a dynamic object indicating that a certain function of a predetermined application is performed as the first image 420 or 620 is selected may correspond to a dynamic object according to an embodiment of the present disclosure.

Figure 7:
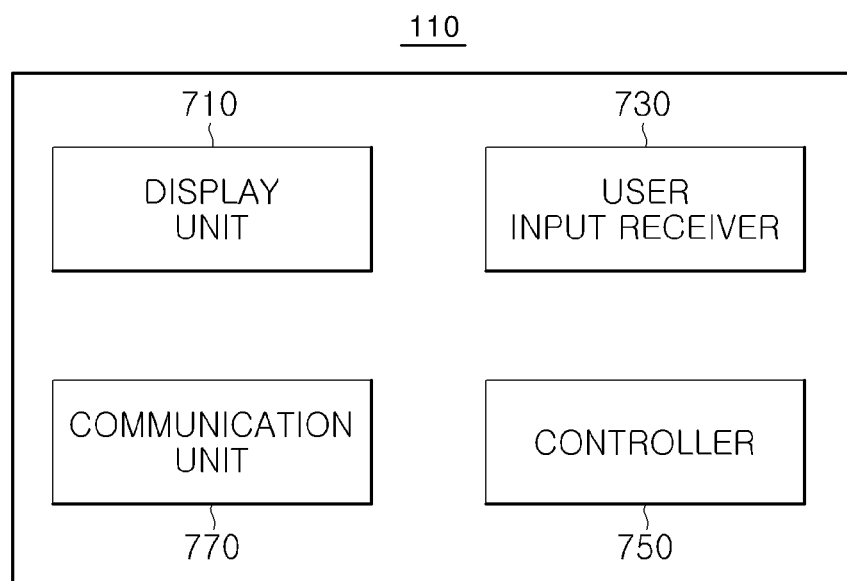
FIG. 7 is a block diagram of a structure of a terminal device according to an embodiment of the present disclosure.

FIG. 7 is a block diagram of a structure of the terminal device 110 according to an embodiment of the present disclosure.

Referring to FIG. 7, the terminal device 110 according to an embodiment of the present disclosure includes a display unit 710, a user input receiver 730, a controller 750, and a communication unit 770.

The display unit 710 displays a webpage on a screen. A predetermined application stored in the terminal device 110 may execute a webpage received from the web server 130 to display the webpage on the screen of the display unit 710. The webpage may include an advertisement image for performing a certain function of the predetermined application.

The user input receiver 730 receives selection of a user with respect to the image. The user input receiver 730 may include various input devices for receiving a user input, such as a touch screen, a mouse, a keyboard, and a track ball.

The controller 750 performs the function of the predetermined application, which corresponds to the image selected by the user. Also, the controller 750 may display a dynamic image corresponding to the first image on the screen while performing the function of the predetermined application.

According to a control command included in the webpage, the controller 750 may determine a point where at least one image is to be located in the webpage, a function of the predetermined application, which is to be performed when the user selects an image, and a shape and operations of a dynamic object displayed on the screen while the function of the predetermined application is performed.

As described above, the function of the predetermined application may include a function of displaying the top or bottom of the webpage, a function of changing a first webpage to a second webpage, or a function of registering the webpage as a favorite.

The communication unit 770 receives the webpage from the web server 130. For example, when there is a webpage display request, the webpage is received from the web server 130, and when a first image performing the function of changing the first webpage to the second webpage is selected by the user, the second webpage is received from the web server 130.

Figure 8:
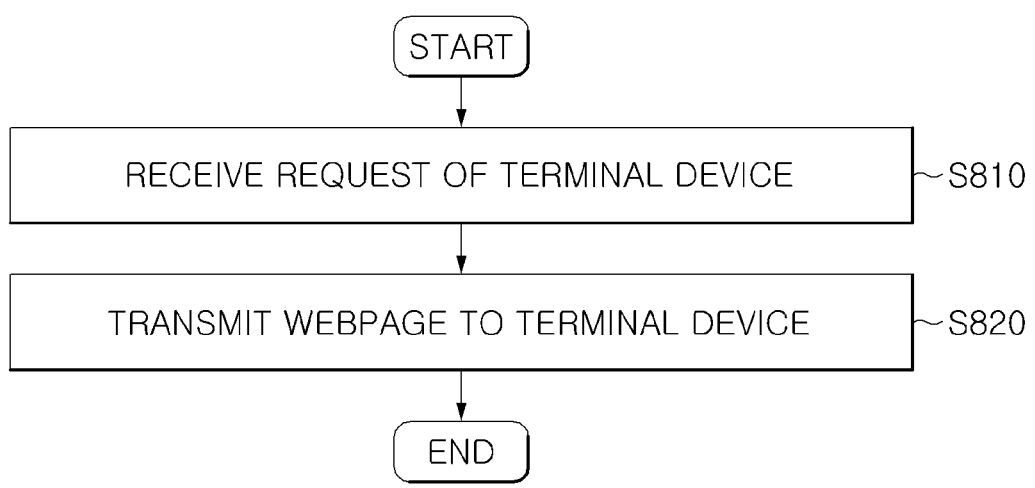
FIG. 8 is a flowchart of a webpage providing method according to an embodiment of the present disclosure.

FIG. 8 is a flowchart of a webpage providing method according to an embodiment of the present disclosure, and is a diagram for describing detailed operations of the web server 130, according to an embodiment of the present disclosure.

First, the web server 130 may store a webpage, and here, the webpage may be received from an external server, or may be stored in the web server 130 after being generated by webpage manufacturers. Alternatively, the webpage may be automatically generated by the web server 130.

In operation S810, the web server 130 receives a request of the terminal device 110 for a certain webpage. The web server 130 may receive a webpage request from the terminal device 110 connected through the network 10 shown in FIG. 1.

In operation S820, the web server 130 transmits the requested webpage to the terminal device 110. When selection of a user with respect to an image included in the webpage is received while the webpage is displayed on the screen of the terminal device 110 through a predetermined application of the terminal device 110, the webpage may control the terminal device 110 to perform a function of the predetermined application, which corresponds to the image.

The webpage may include a control command about where at least one image is to be displayed in the webpage, which function of the predetermined application is to be performed when the user selects the webpage, a shape and manner of displaying a dynamic object while the function of the predetermined application is performed. Upon receiving the webpage, the terminal device 110 may display the webpage according to the control command included in the webpage.

According to another embodiment, the web server 130 may receive a selection signal of the user of the terminal device 110 with respect to an image included in the webpage, and transmit a dynamic object display and/or predetermined application function performance signal to the terminal device 110.

Figure 9:
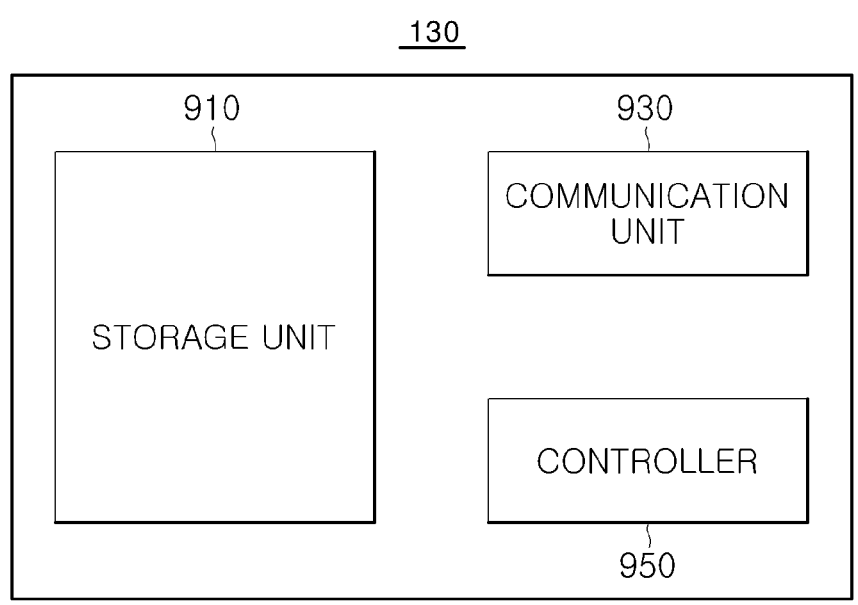
FIG. 9 is a block diagram of a structure of a web server according to an embodiment of the present disclosure.

FIG. 9 is a block diagram of a structure of a web server 130 according to an embodiment of the present disclosure.

Referring to FIG. 9, the web server 130 according to an embodiment of the present disclosure may include a storage unit 910, a communication unit 930, and a controller 950.

The controller 950 controls operations of the storage unit 910 and the communication unit 930, and may be configured as a microprocessor.

The storage unit 910 stores a first webpage. The first webpage may be received from an external server, or may be stored in the web server 130 after being generated by webpage manufacturers. Alternatively, the first webpage may be automatically generated by the web server 130. The first webpage includes a first image performing a function of a predetermined application stored in the terminal device 110.

The communication unit 930 receives a request of the terminal device 110 for a webpage, and transmits the webpage to the terminal device 110 according to the request of the terminal device 110. When a function corresponding to an image is a function of changing a webpage to another webpage, the communication unit 930 may receive a request for the other webpage from the terminal device 110 according to selection of a user with respect to the image, and transmit the other webpage to the terminal device 110.

The webpage may include a control command about where at least one image is to be displayed in the webpage, which function of the predetermined application is to be performed when the user selects the webpage, the shape and manner of displaying a dynamic object while the function of the predetermined application is performed. Upon receiving the webpage, the terminal device 110 may display the webpage according to the control command included in the webpage.

According to another embodiment of the present disclosure, the communication unit 930 receives a selection signal of the user with respect to an advertisement included in the webpage from the terminal device 110. The controller 950 may determine a method of displaying a dynamic object to be processed according to the selection signal of the user and/or a function of the predetermined application to be processed, and transmit signals for performing the method and the function to the terminal device 110 through the communication unit 930.

The embodiments of the present disclosure can be written as computer programs and can be implemented in general-use digital computers that execute the programs using a computer readable recording medium.

One or more of the above embodiments may be embodied in the form of a computer program that can be run in a computer through various elements. The computer program may be recorded on a computer-readable recording medium. Examples of the computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Furthermore, a non-transitory computer-readable recording medium may be a medium that can be transmitted and distributed in a network, e.g., software or an application.

The computer program may be designed and configured specially for the disclosure by those of ordinary skill in the field of computer software. Examples of the computer program include not only machine language codes prepared by a compiler but also high-level codes executable by a computer by using an interpreter.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. Hence, it will be understood that the embodiments described above are not limiting the scope of the disclosure.

What is claimed is:

1. A webpage display method performed by a terminal device, comprising:
   displaying a first webpage on a screen, the first webpage including a first image and a second image;
   receiving a selection of a user of the first image on a first portion of the first webpage displayed on the screen;
   displaying, on the first portion of the first webpage, a dynamic object related to the first image or the second image responsive to the user selection of the first image displayed on the first portion of the first webpage; and
   performing, in response to the user selection of the first image, a predetermined function of scrolling the first webpage to display the second image on a second portion of the first webpage while displaying the dynamic object on the screen, so that the dynamic object appears to be moving over the first webpage from the first image to the second image,
   wherein an appearance of the second image changes when the dynamic object appears to approach the second image within a predetermined distance.

2. The webpage display method of claim 1, wherein the dynamic object comprises a floating object displayed on the screen independently from the scrolling of the first webpage on the screen.

3. The webpage display method of claim 1, wherein the second image is located at a bottom of the first webpage when the first image is located at a top of the first webpage, and
   the second image is located at the top of the first webpage when the first image is located at the bottom of the first webpage.

4. The webpage display method of claim 3, wherein the displaying the dynamic object further comprises:
   determining a direction in which the first webpage is to be moved;
   determining a display direction of the dynamic object based on the determined direction in which the first webpage is to be moved; and
   displaying the dynamic object on the screen according to the determined display direction.

5. A non-transitory computer readable storage medium storing a program for enabling a terminal device to execute the webpage display method of claim 1.

6. A terminal device for displaying a webpage, comprising:
   a display unit having a screen;

a controller configured to display a first webpage which includes a first image and a second image, on the screen of the display unit by using a predetermined application; and a user input receiver configured to receive a selection of a user of the first image displayed on the screen, wherein the controller is further configured to displays, on the first portion of the first webpage, a dynamic object related to the first image or the second image responsive to the user selection of the first image displayed on the first portion of the first webpage, and performs, in response to the user selection of the first image, a predetermined function of scrolling the first webpage to display the second image on a second portion of the first webpage while displaying the dynamic object on the screen, so that the dynamic object appears to be moving over the first webpage from the first image to the second image, and wherein the controller changes an appearance of the second image when the dynamic object appears to approach the second image within a predetermined distance.

7. A webpage providing method performed by a web server, comprising:

receiving a request for a first webpage which includes a first image and a second image from a terminal device; and providing the first webpage to the terminal device responsive to the request of the terminal device, wherein the first webpage controls the terminal device to perform, in response to the user selection of the first image on a first portion of the first webpage, a predetermined function of scrolling the first webpage to display the second image on a second portion of the first webpage while displaying, on the user screen, a dynamic object related to the first image or the second image, so that the dynamic object appears to be moving over the first webpage from the first image to the second image, and wherein an appearance of the second image changes when the dynamic object appears to approach the second image within a predetermined distance.

8. A non-transitory computer readable storage medium storing a program for enabling a web server to execute the webpage providing method of claim 7.

* * * * *